(12) United States Patent
Lin

(10) Patent No.: US 8,918,769 B2
(45) Date of Patent: *Dec. 23, 2014

(54) APPLICATION OF OPTIMIZATION TECHNIQUES TO INTERMEDIATE REPRESENTATIONS FOR CODE GENERATION

(71) Applicant: The MathWorks, Inc., Natick, MA (US)

(72) Inventor: Xiaocang Lin, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/681,748

(22) Filed: Nov. 20, 2012

(65) Prior Publication Data

US 2013/0263082 A1 Oct. 3, 2013

Related U.S. Application Data

(63) Continuation of application No. 13/151,813, filed on Jun. 2, 2011, now Pat. No. 8,316,359, which is a continuation of application No. 11/283,343, filed on Nov. 17, 2005, now Pat. No. 7,966,610.

(51) Int. Cl.
*G06F 9/45* (2006.01)
*G06F 9/44* (2006.01)

(52) U.S. Cl.
CPC .. *G06F 8/34* (2013.01); *G06F 8/35* (2013.01); *G06F 8/443* (2013.01)
USPC ............................ 717/146; 717/151; 717/152

(58) Field of Classification Search
None
See application file for complete search history.

(56) References Cited

U.S. PATENT DOCUMENTS

| | | | |
|---|---|---|---|
| 5,577,233 A | 11/1996 | Goettelmann et al. | |
| 6,289,505 B1 | 9/2001 | Goebel | |
| 7,574,692 B2 | 8/2009 | Herscu | |
| 7,966,610 B2 * | 6/2011 | Lin | 717/153 |
| 8,316,359 B2 * | 11/2012 | Lin | 717/146 |
| 2002/0167544 A1 | 11/2002 | Raghavan et al. | |
| 2003/0046658 A1 | 3/2003 | Raghavan et al. | |
| 2005/0177816 A1 | 8/2005 | Kudukoli et al. | |
| 2006/0064680 A1 * | 3/2006 | Devane | 717/140 |
| 2007/0169039 A1 | 7/2007 | Lin | |

OTHER PUBLICATIONS

Apple Computers, "Xcode 2.0 User Guide," retrieved online at http://developer.apple.com/documentation/DeveloperTools/Conceptual/XcodeUserGuide20/Contents/Resources/en.Iproj/XcodeUserGuide20.pdf, 454 pages, (2007).

Muchnick, Steven, "Advanced Compiler Design and Implementation," Morgan Kaufman Publishers, pp. 1-18 (1997).

(Continued)

*Primary Examiner* — Chuck Kendall
(74) *Attorney, Agent, or Firm* — Nelson Mullins Riley & Scarborough LLP

(57) ABSTRACT

The present invention provides a method and system for optimization of an intermediate representation in a graphical modeling environment. A first intermediate representation is provided. At least one optimization technique is applied to the first intermediate representation. A second intermediate representation is generated responsive to the application of the at least one optimization technique to the first intermediate representation.

20 Claims, 23 Drawing Sheets

(56) References Cited

OTHER PUBLICATIONS

Novillo, Diego, "Tree SSA, A New Optimization Infrastructure for GCC," retrieved online at http://gcc.fyxm.net/summit/2003/Tree%20SSA%20-%20A%20New%20optimization%20infrastructure.pdf, pp. 181-193 (2003).

International Search Report for Appliation No. PCT/US2006/044559, 4 pages, dated Jul. 9, 2007.
European Office Action for Application No. 06827856.3, 5 pages, dated Aug. 27, 2009.
European Search Report for Application No. 11179209.9, 7 pages, dated Jan. 17, 2012.
European Office Action for Application No. 11179209.9, 5 pages, dated Apr. 12, 2013.

* cited by examiner

```
if ((var1 > var2) && (var1 > 0)) {
        ... // op1
} else if ((var2 > var3) && (var1 > 0)) {
        ... // op2
}
```

```
if (var1 > 0) {
        if (var1 > var2) {
        ... // op1
        } else (var2 > var3) {
        ... // op2
        }
}
```

```
a = expression1;
b = expression2;
do_operation(a);
do_operation(b);
```

```
a = expression1;
do_operation(a);
b = expression2;
do_operation(b);
```

```
unsigned int var1;
...
if (var1 >= 0) {
    /* operation A */
} else {
    /* operation B */
}
```

```
unsigned int var1;
/* operation A */
```

```
for (int i=0; i<5; i++) {
    int tmp[5];
    tmp[i] = u1[i] * u2[i];
    function1(tmp[i]);
    ...
}
```

```
for (int i=0; i<5; i++) {
    int tmp;
    tmp = u1[i] * u2[i];
    function1(tmp);
    ...
}
```

```
if (1 > 0) {
      … // operation1;
} else {
      … // operation2;
}
```

… // operation1;

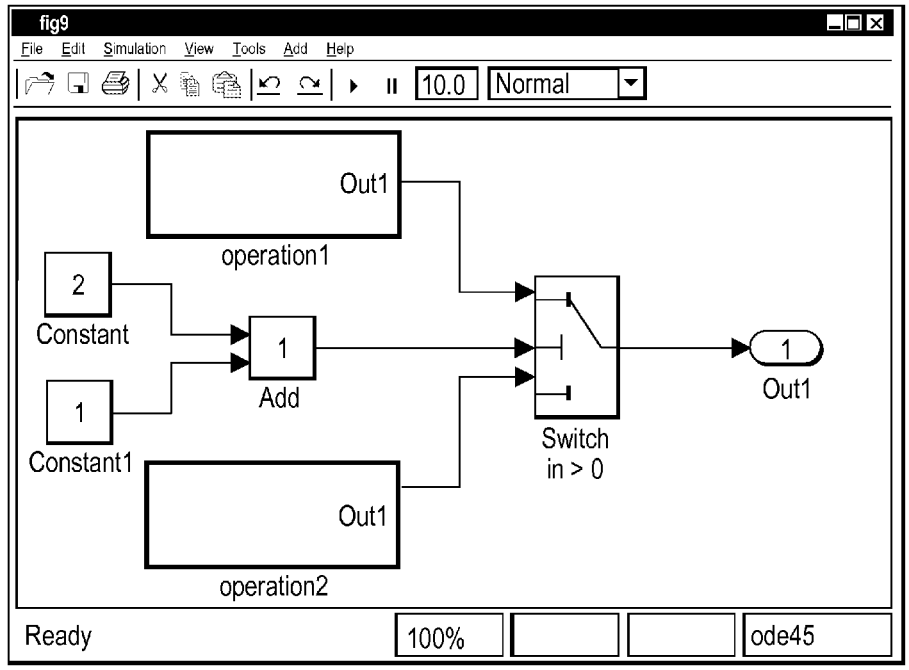

```
for (idx1 = 0; idx1 < 10; idx1++) {
    operation1(idx1);
}
for (idx2 = 1; idx2 <= 10; idx2++) {
    operation2(idx2);
}
```

```
for (idx = 0; idx < 10; idx++) {
    Operation1(idx);
        Operation2(idx+1);
}
```

```
int out;
foo() {
    int a,b,c,d;
    a = 5;                              --- 1
    b = a + 3;                          --- 2
    c = a + b;                          --- 3
    d = c + b;                          --- 4
    out = a + d;                        --- 5
}
```

*Fig. 11A*

```
foo() {
    int a, b, c, d;
    bar(&a, &b, &c);
    d = c+b;
    out = a+d;
}
bar(int& a, int& b, int& c) {
    a = 5;
    b = a + 3;
    c = a + b;
}
```

*Fig. 11B*

```
foo() {
    int a, d;
    a = 5;
    bar(a, d);
    out = a + d;
}
bar(int& a, int& d) {
    b = a + 3;
    c = a + b;
    d = c + b;
}
```

*Fig. 11C*

```
if (...) {
        rtB.if = ...;
} else {
        rtB.if = ...;
}
y.out1 = rtwB.if;
```

*Fig. 12A*

```
if (...) {
        y.out1 = ...;
} else {
        y.out1 = ...;
}
```

*Fig. 12B*

```
bool v1, v2, v3, v4;
```

*Fig. 13A*

```
struct {
        int v1 : 1;
        int v2 : 1;
        int v3 : 1;
        int v4 : 1;
} bitfield;
```

*Fig. 13B*

```
if (cond1) {
      Action1;
} else if (cond2) {
      Action1;
} else {
      Action2;
}
```

*Fig. 14A*

```
if (cond1 || cond2) {
Action1;
} else {
Action2;
}
```

*Fig. 14B*

```
switch (cond) {
      case1:
            Action1;
            break;
      case2:
            Action1;
            break;
      default:
            Action2;
}
```

*Fig. 14C*

```
switch(cond)
      case1:
      case2:
            Action1;
            break;
      default:
            Action2;
}
```

*Fig. 14D*

```
void g_step(void)
    {
        {
          int32_T i1;
          /* Outport: '<Root>/Out1' incorporates:
           *  Constant: '<Root>/Constant'
           */
          for(i1=0; i1<10; i1++) {
            g_Y.Out1[i1] = g_P.Constant_Value[i1];
          }
        }
    }

Parameters_g g_P = {
        { 0.0, 1.0, 2.0, 3.0, 4.0, 5.0, 6.0, 7.0, 8.0, 9.0 }
    };
```

Fig. 15A

```
void g_step(void)
{
    int32_T i1;
    for(i1=0; i1<10; i1++) {
    g_Y.Out1[i1] =  real_T(i1);
    }
}
```

Fig. 15B

```
for (i = 0; i < 1; i++)
{
        a[i] = 0;
}
```

```
foo(real_T u1, int_T u2, real_T *y1, int_T *y2) {
  real_T a;
  int_T  b;
  a = u1*u1;
  y1 = a - u1;
  b = u1*u2;
  y2 = b - u2;
}
```
*Fig. 17A*
```
foo(real_T u1, int_T u2, real_T *y1, int_T *y2) {
  uint8_T memory[8];
  *((int_T*)memory) = u1*u1;
  y1 = *((int_T*)memory) - u1;
  *((real_T*)memory) = u2*u2;
  y2 = *((real_T*)memory) - u2;
}
```
*Fig. 17B*
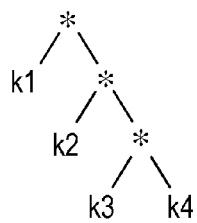
*Fig. 18A*
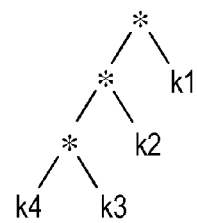
*Fig. 18B*

```
int32_T i;
for (i = 0; i < 8; i++) {
...
}
```

*Fig. 19A*

```
int8_T i;
for (i = 0; i < 8; i++) {
...
}
```

*Fig. 19B*

```
rtb_RelationalOperator = (BusSwitch_U.In1 == BusSwitch_U.In2);
if(rtb_RelationalOperator) {
    rtb_In22 = BusSwitch_U.In1;
} else {
    rtb_In22 = BusSwitch_U.In22;
}
if(rtb_RelationalOperator) {
    rtb_In33 = BusSwitch_U.In33;
} else {
    rtb_In33 = BusSwitch_U.In33;
}
BusSwitch_Y.BusOut[0] = rtb_In22;
BusSwitch_Y.BusOut[1] = rtb_In33;
```

*Fig. 20A*

```
rtb_RelationalOperator = (BusSwitch_U.In1 == BusSwitch_U.In2);
if(rtb_RelationalOperator) {
    rtb_In22 = BusSwitch_U.In1;
    rtb_In33 = BusSwitch_U.In33;
} else {
    rtb_In22 = BusSwitch_U.In22;
    rtb_In33 = BusSwitch_U.In33;
}
BusSwitch_Y.BusOut[0] = rtb_In22;
BusSwitch_Y.BusOut[1] = rtb_In33;
```

*Fig. 20B*

```
int a = 0;
int b = 0;
while (a < 10) {
        b = expression;
        a = a + b;
}
```

```
int a = 0;
while (a < 10) {
        int b = 0;
        b = expression;
        a = a + b;
}
```

```
void SelectOut(
    const real_T rtu_In2[4],
    const real_T rtu_In3[4],
    const real_T rtu_In4[4],
    rtB_SelectOut *localB,
    rtP_SelectOut *localP)
{
    int32_T i1;

switch((int32_T)localP->Constant3_Value) {
     case 1:
      for(i1=0; i1<4; i1++) {
          localB->MultiportSwitch[i1] = rtu_In2[i1];
      }
      break;
     case 2:
      for(i1=0; i1<4; i1++) {
          localB->MultiportSwitch[i1] = rtu_In3[i1];
      }
      break;
     case 3:
      for(i1=0; i1<4; i1++) {
          localB->MultiportSwitch[i1] = rtu_In4[i1];
      }
      break;
    }
}
```

*Fig. 22B*

```
void SelectOut(
    const real_T rtu_In2[4],
    const real_T rtu_In3[4],
    const real_T rtu_In4[4],
    rtB_SelectOut *localB,
    rtP_SelectOut *localP)
{
    int32_T i1;
    switch((int32_T)localP->Constant3_Value) {
     case 1:
         localB->MultiportSwitch = rtu_In2;
         break;
     case 2:
         localB->MultiportSwitch = rtu_In3;
         break;
     case 3:
         localB->MultiportSwitch = rtu_In4;
         break;
    }
}
```

*Fig. 22C*

```
uint32_T u32_chi;
  uint32_T u32_clo;
  int8_T i_negC = 0;
  uint32_T u32_a;
  uint32_T u32_b;
  uint32_T u32_alo;
  uint32_T u32_ahi;
  uint32_T u32_blo;
  uint32_T u32_bhi;
  uint32_T u32_phihi;
  uint32_T u32_philo;
  uint32_T u32_plohi;
  uint32_T u32_plolo;
  uint32_T u32_carry;
```

*Fig. 25A*

```
uint32_T u32_chi, u32_clo;
  int8_T i_negC = 0;
  uint32_T u32_a, u32_b, u32_alo, u32_ahi, u32_blo, u32_bhi;
  uint32_T u32_phihi, u32_philo, u32_plohi, u32_plolo, u32_carry;
```

*Fig. 25B*

```
if (cond) {
    …
}
```

*Fig. 26A*

```
if (cond)
{
    …
}
```

*Fig. 26B*

```
for (i = 1; i < 5; i++) {
        operate(array[i]);
}
```

*Fig. 27A*

```
for (i = 1; i < 5; i++) {
        operate(*(array + i));
}
```

*Fig. 27B*

APPLICATION OF OPTIMIZATION TECHNIQUES TO INTERMEDIATE REPRESENTATIONS FOR CODE GENERATION

FIELD OF THE INVENTION

The present invention generally relates to the application of optimization techniques to an intermediate representation, and in particular, to the application of an optimization technique to a first intermediate representation and generation of a second intermediate representation responsive to the application of the optimization technique to the first intermediate representation for automatic code generation in a graphical modeling environment.

BACKGROUND OF THE INVENTION

Modeling software allows a developer to model the characteristics of a system, for example to evaluate if the system will meet the desired design requirements. Additionally, a modeled system may be rapidly reconfigured and various embodiments may be tested before a single piece of hardware is actually constructed. A model may be constructed using numerous pieces of currently available software, including MATLAB®, Simulink®, and Stateflow® from The MathWorks, Inc. of Natick, Mass. Upon creation of a model, and evaluation of the model, it is desirable to generate a system implementation in a format readily exported for use in the actual hardware fabrication. For example, the desired system implementation can be in a hardware description language such as VHDL, Verilog or SystemC.

The process of translating a system model into a system implementation is computationally intensive, and ordinarily performed in many steps. Conventionally, an intermediate representation is used to facilitate this process. Intermediate representations typically allow for a change in levels of abstraction from a source language to a target language and a corresponding system implementation.

Unfortunately, conventional solutions do not typically allow review or optimization of the intermediate representation prior to the generation of target language from the intermediate representation. Without an opportunity to review, modify or optimize the intermediate representation, the code generated by the intermediate representation may suffer from many deficiencies. These deficiencies may include increased execution time, increased ROM usage, increased RAM usage, and decreased readability of the code. A method enabling the optimization of an intermediate representation, increasing the efficiency and quality of the code generated by the intermediate representation, would be desirable.

SUMMARY OF THE INVENTION

In one aspect, the present invention relates to a method for optimizing an intermediate representation. A first intermediate representation derived from an at least one implementation in at least one source language of a system model is provided. The first intermediate representation may be derived from an implementation in a single source language of a system model or from a mixture of multiple implementations in multiple source languages of a system model. More generally, the source inputs to the code generation process may contain information from different domains, different formats of block diagrams or a mixture of textual source language and a graphical source language. At least one optimization technique is applied to the first intermediate representation. A second intermediate representation is generated, responsive to the applying of the at least one optimization technique to the first intermediate representation.

In one embodiment, an optimization technique may be selected from a plurality of optimization techniques for application to the first intermediate representation. The selected optimization technique may enable increased user control over the style and type of generated code, streamlining of generated code, or elimination of superfluous code.

In another aspect, the present invention relates to a system for optimizing an intermediate representation, including a first intermediate representation, an analyzer and a generator. The first intermediate representation is derived from at least one implementation in at least one source language of a system model. The analyzer analyzes the first intermediate representation and applies at least one optimization technique to the first intermediate representation. The generator generates a second intermediate representation responsive to the applying of the at least one optimization technique to the first intermediate representation. In one embodiment, the analyzer selects, based on a target language, at least one optimization technique from a plurality of optimization techniques. In another embodiment, the generator generates a second intermediate representation, wherein the second intermediate representation maintains the algorithmic meaning of the first intermediate representation.

In still another aspect, the present invention relates to a medium holding computer executable instructions for a method of optimizing an intermediate representation. A first intermediate representation derived from at least one implementation in at least one source language of a system model is provided. At least one optimization technique is applied to the first intermediate representation. A second intermediate representation is generated, responsive to the applying of the at least one optimization technique to the first intermediate representation

BRIEF DESCRIPTION OF FIGURES

These and other aspects of this invention will be readily apparent from the detailed description below and the appended drawings, which are meant to illustrate and not to limit the invention, and in which:

FIG. 9A depicts an example of a graphical model for which the constant folding optimization may be applied during the code generation process.

FIG. 9B depicts code generated from a first intermediate representation for the graphical model of FIG. 9A.

FIG. 9C depicts code generated from a second intermediate representation where the constant folding optimization has been applied.

FIG. 11A depicts one embodiment of code generated from an intermediate representation prior to the application of an optimization technique to the intermediate representation;

FIG. 11B depicts an embodiment of code generated with a maximum size of 3 lines of code;

FIG. 11C depicts one embodiment of code generated by an intermediate representation resulting from an application of an optimization technique providing automatic function packaging to the intermediate representation;

FIG. 12A depicts one embodiment of C code generated from an intermediate representation prior to the application of a back-folding optimization technique to the intermediate representation;

FIG. 12B depicts one embodiment of code generated by an intermediate representation resulting from an application of a back-folding optimization technique;

FIG. 13A depicts one embodiment of C code generated from an intermediate representation prior to the application of an optimization technique to the intermediate representation;

FIG. 13B depicts one embodiment of code generated by an intermediate representation resulting from an application of an optimization technique;

FIG. 14A depicts one embodiment of C code generated from an intermediate representation prior to the application of an optimization technique to the intermediate representation;

FIG. 14B depicts one embodiment of code generated by an intermediate representation resulting from an application of an optimization technique;

FIG. 14C depicts one embodiment of C code generated from an intermediate representation prior to the application of an optimization technique to the intermediate representation;

FIG. 14D depicts one embodiment of code generated by an intermediate representation resulting from an application of an optimization technique;

FIG. 15A depicts an embodiment of code generated from an intermediate representation representing a Simulink model with a Constant block of a vector constant;

FIG. 15B depicts an embodiment of code generated from an intermediate representation resulting from an application of an optimization technique to the intermediate representation;

FIG. 16A depicts one embodiment of C code generated from an intermediate representation prior to the application of an optimization technique to the intermediate representation;

FIG. 16B depicts one embodiment of code generated by an intermediate representation resulting from an application of an optimization technique;

FIG. 17A depicts one embodiment of C code generated from a first intermediate representation prior to the application of an optimization technique to the intermediate representation;

FIG. 17B depicts one embodiment of code generated by an intermediate representation resulting from an application of an optimization technique;

FIG. 18A depicts one embodiment of an Abstract Syntax Tree representing a right recursive expression;

FIG. 18B depicts one embodiment of an Abstract Syntax Tree representing a left recursive expression;

FIG. 19A depicts one embodiment of C code generated from a first intermediate representation prior to the application of an optimization technique to the intermediate representation;

FIG. 19B depicts one embodiment of code generated by an intermediate representation resulting from an application of an optimization technique;

FIG. 20A depicts one embodiment of C code generated from a first intermediate representation prior to the application of an optimization technique to the intermediate representation;

FIG. 20B depicts one embodiment of code generated by an intermediate representation resulting from an application of an optimization technique;

FIG. 22B depicts code generated from an intermediate representation prior to the application of an optimization technique to determine when data buffers are read and written;

FIG. 22C shows one embodiment of code generated from a second intermediate representation which results from an application of an optimization technique determining when data buffers are read and written;

FIG. 25A depicts one embodiment of a typical variable declaration;

FIG. 25B depicts a second embodiment of a variable declaration;

FIG. 26A depicts one embodiment of a conditional if statement;

FIG. 26B depicts one embodiment of a second type of conditional if statement;

FIG. 27A depicts one embodiment of array indexing code; and

FIG. 27B depicts one embodiment of code enabling access to an array element using a pointer offset.

DETAILED DESCRIPTION

Figure 1A:
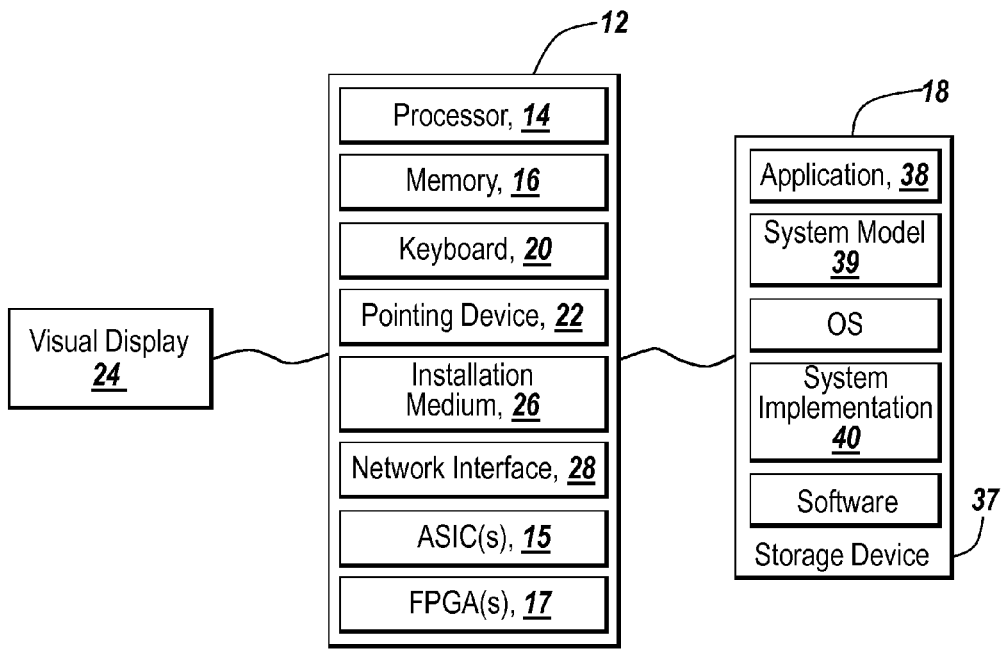
FIG. 1A is a block diagram depicting an environment suitable for practicing an illustrative embodiment of the present invention.

The present invention provides systems and methods for applying at least one optimization technique to a first intermediate representation and generating a second intermediate representation responsive to the applying of the at least one optimization technique to the first intermediate representation.

A result of applying optimization techniques to intermediate representations is an improvement in the run-time characteristics of the generated code, such as a reduction in execution time. An additional result of applying optimization techniques to intermediate representations is an increased ability to conform to industrial standards or target environment requirements. Using suitable optimizations increases the likelihood of the compatibility of the generated code with these requirements. Other benefits of applying optimization techniques to intermediate representations include improved aesthetics and readability of the generated code and improvements in the code generation process itself, including reduced execution times and reduced memory consumption during code generation. The present invention is well-suited for taking a representation of a model in a declarative language to produce a representation in an imperative language.

Still another result of applying optimization techniques to intermediate representations is a reduced size of code generated from the intermediate representation. Another result of applying optimization techniques to intermediate representations is a reduction in the overall size of variables used in the generated code. The overall size of variables determines the memory usage when the generated code is complied to generate an executable file. By reducing the overall size of variables in the generated code, the same functionality requires a smaller memory usage.

The present invention is well-suited for real-time applications, such as with some embedded systems, where timing of execution is critical. The optimizations described herein can be used to optimize code so that the code can timely handle tasks in real-time. In contrast, conventional compilers may provide certain optimizations but not produce optimized code suitable for real-time applications.

Before proceeding with the remainder of the detailed description, it is first helpful to define a few terms used throughout the disclosure.

As used herein, the term "system model" is defined as a representation of a desired system. The system model may be constructed using numerous software packages for use in designing electronic, mechanical, biological, or other systems. For example, a Simulink® block diagram model environment, from The MathWorks of Natick, Mass., may be utilized in creating a system model for use with the present invention. In an alternate example, a SimMechanics® model environment, available from MathWorks of Natick, Mass., can be used in creating a system model representative of a physical system for use with the present invention. One skilled in the art will readily recognize that the system model may take numerous forms, each of which may be represented by various software packages.

As used herein, the term "system implementation" is defined as the syntax necessary for use in the fabrication of the components of the system as represented by a system model. A system implementation can include electronic circuitry, software running on a computer, mechanical components, biological components, or any other technology from which a system can be constructed.

The term "source language" is used herein to refer to a language that defines the system behavior of the system model. Examples of applicable source languages include, but are not limited to, a block diagram programming language, a statechart programming language, a matrix language, a hardware description language, a programming language or a graphical circuit design language. Programming environments such as Simulink®, Stateflow® and MATLAB®, from the MathWorks, Inc. of Natick, Mass., are representative environments which provide an applicable source language for use with the current invention, yet those skilled in the art will recognize that these are examples of applicable environments and are not intended to be an exhaustive list of applicable source languages.

The term "target language" is herein defined as the language necessary for generation of a system implementation. Examples of suitable target languages for use with the present invention include, but are not limited to C, C++, VHDL, Verilog and SystemC. It is also possible and sometimes desirable to use the above-mentioned source languages as target languages.

An "intermediate representation" is used herein to refer to a representation, such as a data structure that is stored in memory, in a file, in a database, or any other storage medium, and that is constructed from input data contained within a source language and from which part or all of the target language data is constructed in turn. The intermediate representation of the present invention further allows for the serial and parallel processing of the representation in the source language within the individual intermediate representation. In one embodiment of the present invention, the use of an intermediate representation allows for the translation of a representation in one or more source languages to a representation in a target language such that a system implementation can be generated from at least one initial system model. The translation may be for a representation in a declarative language to a representation in an imperative language.

Referring now to FIG. 1A, a block diagram depicts an environment suitable for practicing an illustrative embodiment of the present invention. The environment includes a computing device 12 having memory 16, in which software according to one embodiment of the present invention may be stored, one or more processors (CPU) 14 for executing software stored in the memory 16, and other programs for controlling system hardware. The processors may be multiple core processors, and portions of the processing performed by the present invention may be performed by the respective cores. The memory 16 may comprise a computer system memory or random access memory such as DRAM, SRAM, EDO RAM, etc. The memory 16 may comprise other types of memory as well, or combinations thereof. A human user may interact with the computing device 12 through a visual display device 24 such as a computer monitor, which may include a graphical user interface (GUI). The computing device 12 may include other I/O devices such as a keyboard 20 and a pointing device 22, for example a mouse, for receiving input from a user. Optionally, the keyboard 20 and the pointing device 22 may be connected to the visual display device 24. The computing device 12 may include other suitable conventional I/O peripherals. The computing device 12 may support any suitable installation medium 26, a CD-ROM, floppy disks, tape device, USB device, hard-drive or any other device suitable for installing software programs capable of generating a system model for use in the present invention 105. The computing device 12 may further comprise a storage device 37, such as a hard-drive or CD-ROM, for storing an operating system and other related software, and for storing application software programs such as an application 38 which can generate a system model 39 for use with the present invention. Additionally, the operating system and the application 38 can be run from a bootable CD, such as, for example, KNOPPIX®, a bootable CD for GNU/Linux.

The computing device 12 may include other types of hardware, such as field programmable gate arrays (FPGA's) 15, application specific integrated circuits (ASIC's) 17 or other hardware. The application or a portion of the application may run on this hardware to provide hardware acceleration or other benefits.

The present invention may be practiced in a virtualized environment as opposed to on an exclusively dedicated machine. For example, the application 28 may be run on a virtual machine (VM), where multiple VM's are supported by the system of FIG. 1A. A single processor may support multiple virtualized environments that execute independently as if executing on separate machines.

Additionally, the computing device 12 may include a network interface 28 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 28 may comprise a built-in network adapter, network interface card, PCMCIA network card, card bus network adapter, wireless network adapter, USB network adapter, modem or any other device suitable for interfacing the computing device 12 to any type of network capable of communication and performing the operations described herein. Moreover, the computing device 12 may be any computer system such as a workstation, desktop computer, server, laptop, handheld computer or other form of computing or telecommunications device that is capable of communication and that has sufficient processor power and memory capacity to perform the operations described herein.

In one embodiment, the present invention provides an application 38 capable of generating a system model 39. In particular, a user may interact with the application 38 to build the system model 39. In brief overview, the application 38 allows for the generation of a system model 39, which can be converted into a system implementation 40 using at least one intermediate representation. The application 38 may reside on a storage device 37 or in memory 16.

Figure 1B:
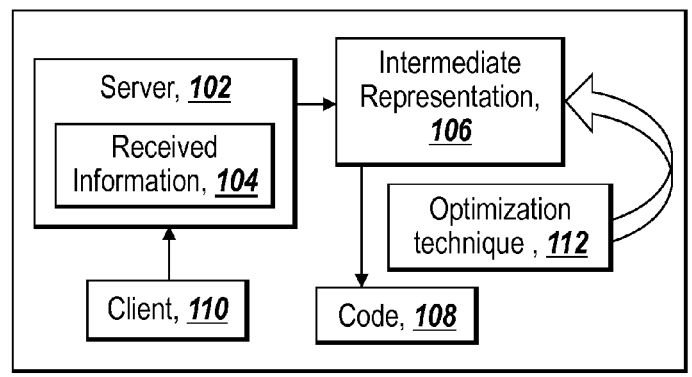
FIG. 1B depicts a distributed environment suitable for practicing an illustrative embodiment of the present invention.

Referring now to FIG. 1B, a distributed environment is depicted in which the present invention may be performed. The environment includes a server 102, received information 104, an intermediate representation 106, code 108, a client 110, and an optimization technique 112. The server 102 may receive information 104 from the client 110. The server 102 may generate an intermediate representation 106 based on the received information 104. The received information 104 may be a model of a system expressed in a source language. The received information 104 also may be multiple system models expressed in multiple source languages or portions of system models where each portion is expressed in one or more source languages. As was stated above, the received information can contain information from multiple domains, different formats of block diagrams or a mixture of a textual source language and a graphical source language. The received information 104 may specify a target language into which the model of the system should be translated. One or more optimization techniques 112 may be applied to the intermediate representation 106. In some embodiments, a second intermediate representation may be generated after an application of an optimization technique 112 to the intermediate representation 106.

Figure 2:
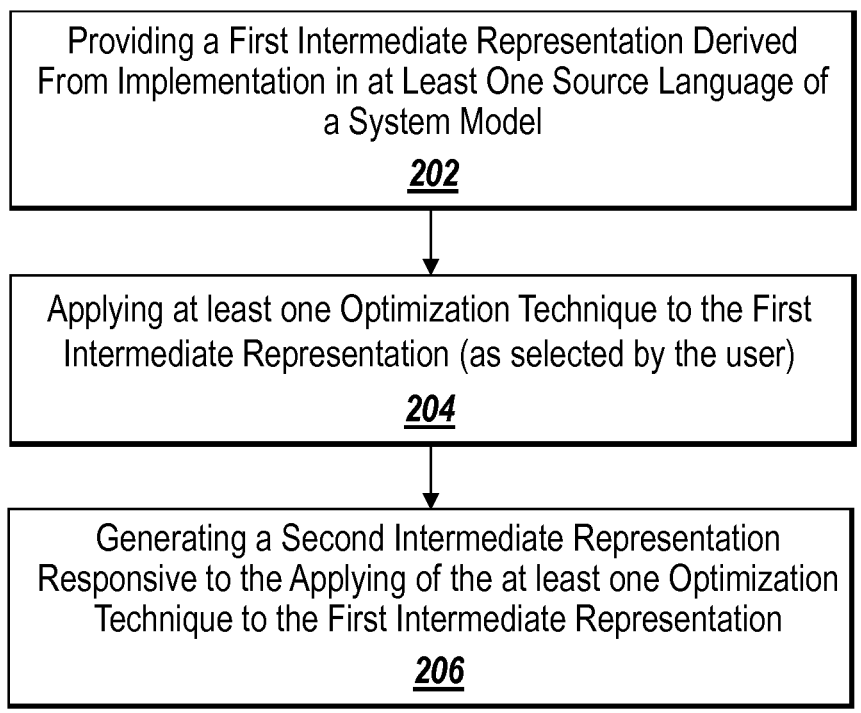
FIG. 2 is a flow diagram depicting one embodiment of the steps taken in a graphical modeling environment to optimize an intermediate representation.

Referring now to FIG. 2, a flow diagram depicts one embodiment of the steps taken in a graphical modeling environment to optimize an intermediate representation. The graphical modeling environment may be a block diagram model environment. A first intermediate representation is provided (step 202). The first intermediate representation may be generated from an implementation in a source language of a system model. As was mentioned above, the first intermediate representation alternatively may be generated from multiple system models in multiple source languages or portions of system models expressed in multiple source languages.

User data relating to a system model may be collected to generate the first intermediate representation. The user data may include a model file or a workspace variable. An intermediate representation of the algorithmic aspect of the model may be constructed in response to an analysis of the semantics of the system model. Optimization techniques may be employed to facilitate the analysis. The intermediate representation retains the data flow and control flow that is described by the original system model, but not any product-specific syntax. The intermediate representation may be used to construct a textual or binary code that can be compiled by a general purpose compiler, e.g. C/C++ compiler, to generate executables that can numerically reproduce the simulation scenarios described in the original system model. Thus, the intermediate representation may be referred to as a Code Generation Intermediate Representation (CGIR).

It should be appreciated that the application of optimization techniques in the present invention may be iterative.

There may be multiple transitions of intermediate representations before the optimizations are applied. Moreover, there may be multiple transitions of intermediate representations while applying optimizations. At each transition, one or more optimization techniques may be applied. Further, an optimization technique may be applied multiple times during the entire code generation process. Transitions between intermediate representations may occur during the process which do not involve optimizations.

For purposes of clarity and simplicity, the discussion below focuses on the simplified case where there is a single transition from a first intermediate representation to a second intermediate representation. Nevertheless, those skilled in the art will appreciate (as discussed above) that multiple transitions and multiple optimizations may be applied.

Figure 3A:
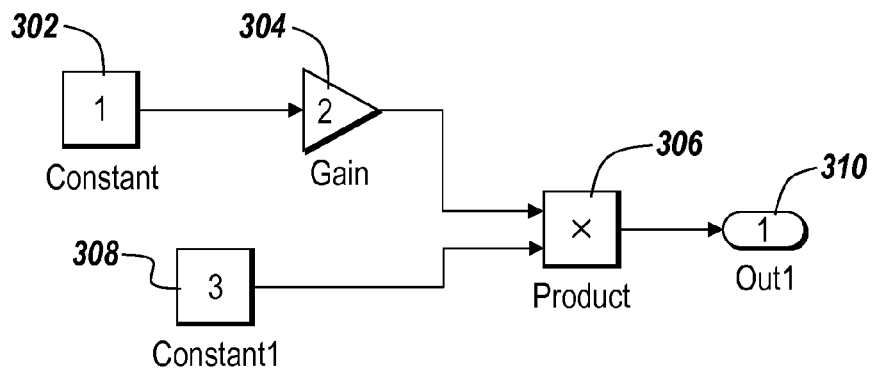
FIG. 3A is a block diagram depicting one embodiment of a system model.
Figure 3B:
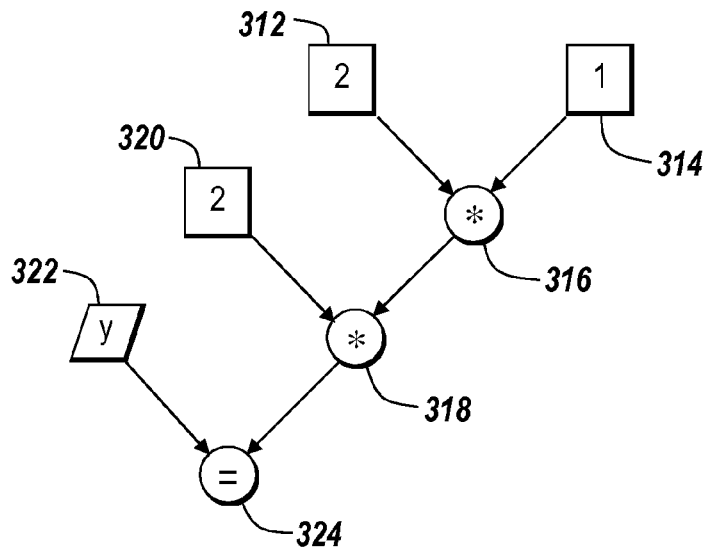
FIG. 3B is a block diagram depicting one embodiment of an intermediate representation of a system model.
Figure 3C:
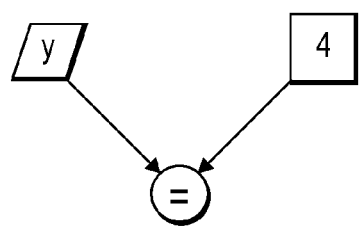
FIG. 3C is a block diagram depicting one embodiment of an optimized intermediate representation.

Referring ahead to FIGS. 3A, 3B, and 3C, block diagrams depict one embodiment of a system model (FIG. 3A), of an intermediate representation of the system model (FIG. 3B), and of an intermediate representation to which an optimization technique has been applied (FIG. 3C). FIG. 3B depicts each of the elements shown in FIG. 3A but without product-specific syntax. FIG. 3C depicts a second intermediate representation generated responsive to the application of an optimization technique to the first intermediate representation depicted in FIG. 3B.

Referring back to FIG. 2, at least one optimization technique is applied to the first intermediate representation (step 204). A user may control what optimization technique(s) are applied and to what portion of the model the optimizations are applied. In come cases, the optimizations may be applied to only a portion of the model and in other cases, the optimizations may be applied to the whole model, as dictated by user control. For example, a particular block type may be selected for application of an optimization technique or to blocks that are specifically passed. Analysis and optimizations may be applied to the first intermediate representation to augment, reduce, or transform one form of representation to another form. The content, structure, and format of the representations can be changed during each application of an optimization technique. A single optimization technique may be applied multiple times. There may be as many applications of optimization technique as a user of the code generation process desires. Employing optimizations in the code generation process may improve the efficiency and the effectiveness of the generated code as well as the code generation process itself. In some embodiments, optimization techniques may be applied prior to the generation of the first intermediate representation, as well as prior to the generation of the second intermediate representation.

A second intermediate representation is generated in response to the application of the at least one optimization technique to the first intermediate representation (step 206). The second intermediate representation maintains the meaning of the original system model and of the first intermediate representation. The second intermediate representation may be represented by a target language. The second intermediate representation may have a state suitable to a backend of the code generation process. Therefore, a user of the code generation process may employ different optimization techniques depending on the purpose of a particular intermediate representation. In some embodiments, an additional intermediate representation may be generated after each application of an optimization technique to the first intermediate representation.

Figure 4A:
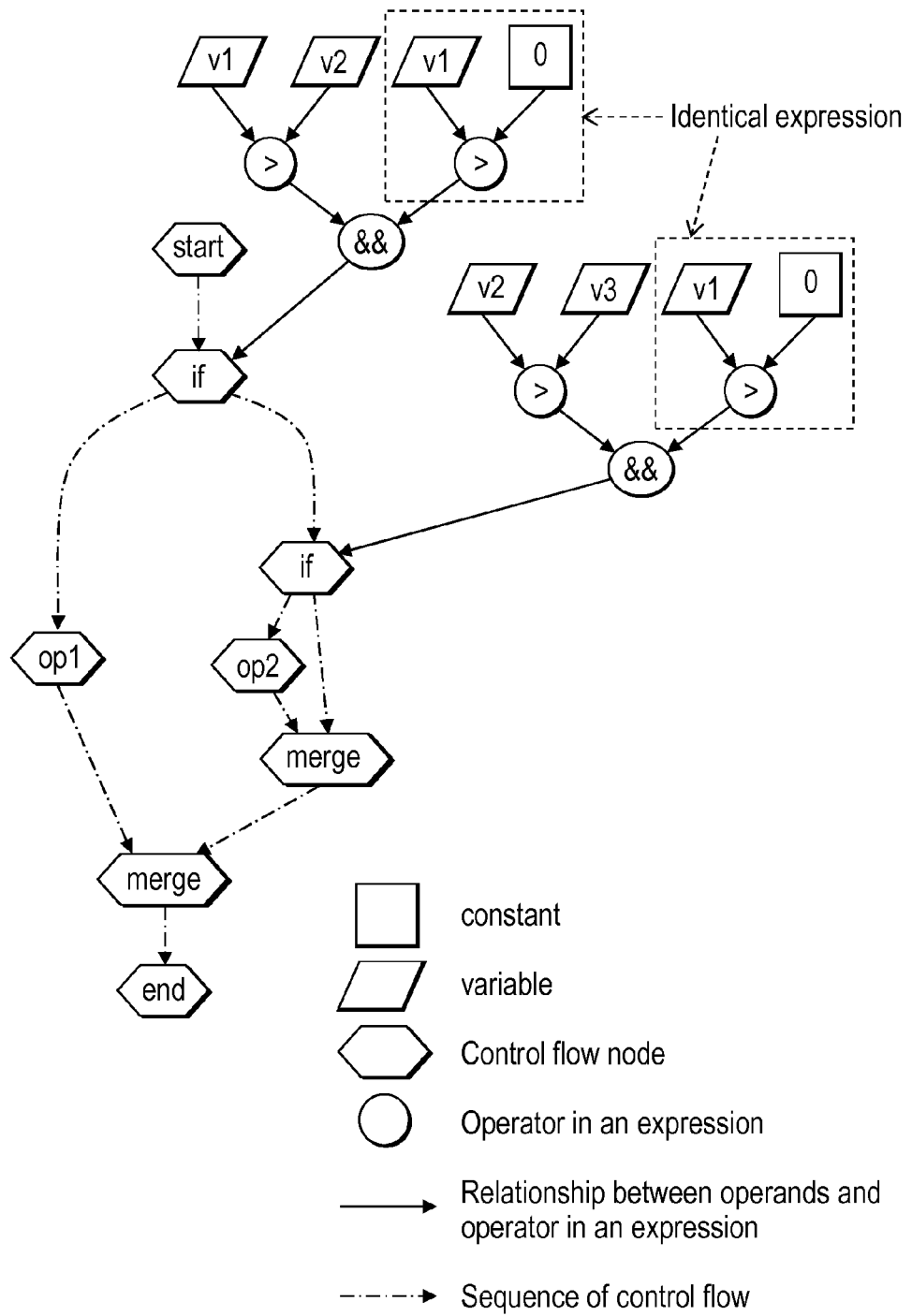
FIG. 4A depicts one embodiment of an intermediate representation shown as a directed graph.
Figures 4B, 4C:
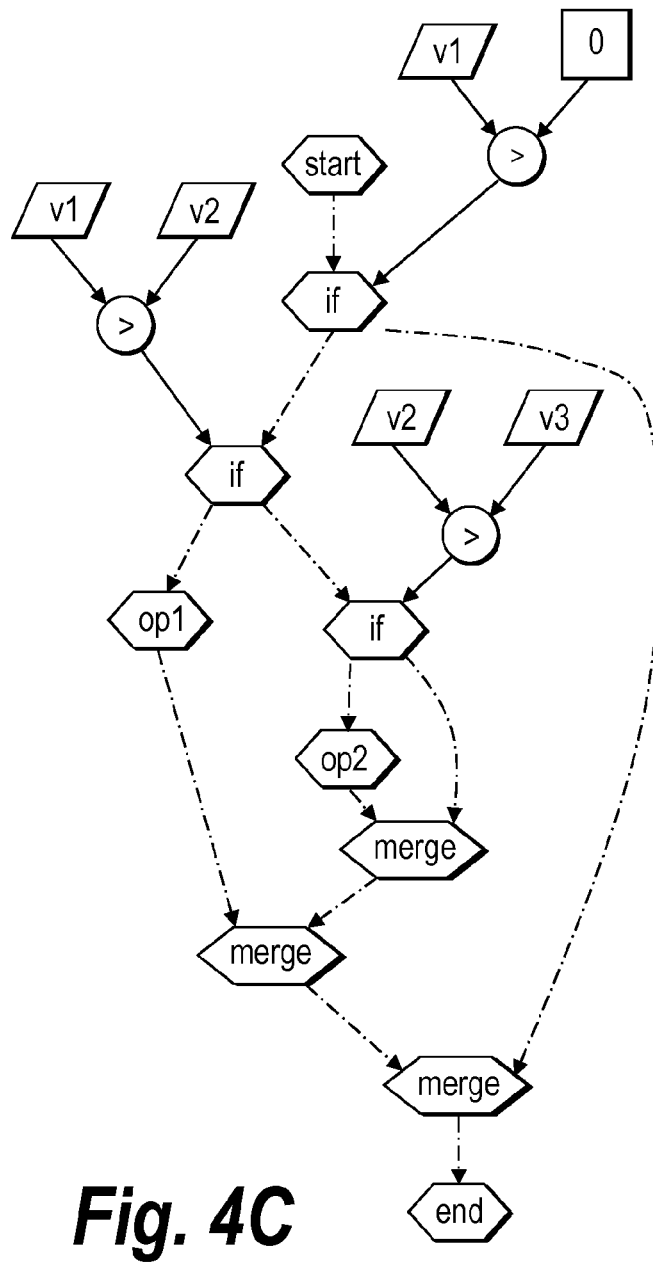
FIG. 4B depicts one embodiment of a C++ expression generated responsive to an intermediate representation.
FIG. 4C depicts one embodiment of an intermediate representation to which an optimization technique has been applied.
Figures 4D, 4E:
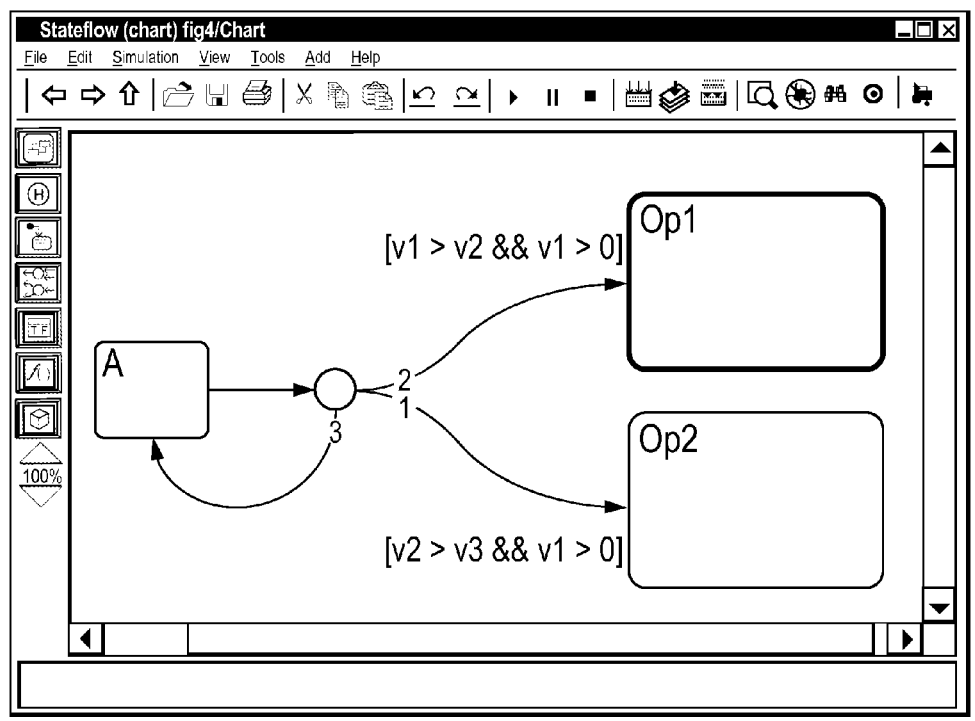
FIG. 4D depicts one embodiment of a C++ expression generated responsive to an intermediate representation to which an optimization technique has been applied.
FIG. 4E depicts an example of a state chart that is source input for the optimization referenced by FIGS. 4B-4D.

The optimization technique applied may be an optimization technique for eliminating a common sub-expression in the intermediate representation. This optimization technique identifies common sections among multiple expressions and factor out the common sub-expressions for better code efficiency and readability. This optimization technique may be referred to as common sub-expression elimination. In one embodiment the source input is a state chart as shown in FIG. 4E. A first intermediate representation is depicted as a directed graph such as the graph shown in FIG. 4A. FIG. 4B depicts one embodiment of a C++ expression generated in response to the first intermediate representation shown in FIG. 4A.

By analyzing expressions for common statements and factoring out common sub-expressions, the intermediate representation can be simplified as depicted in FIG. 4C, which depicts one embodiment of a second intermediate representation. FIG. 4D depicts one embodiment of a C++ expression generated responsive to the second intermediate representation.

Figures 5A, 5B, 5C:
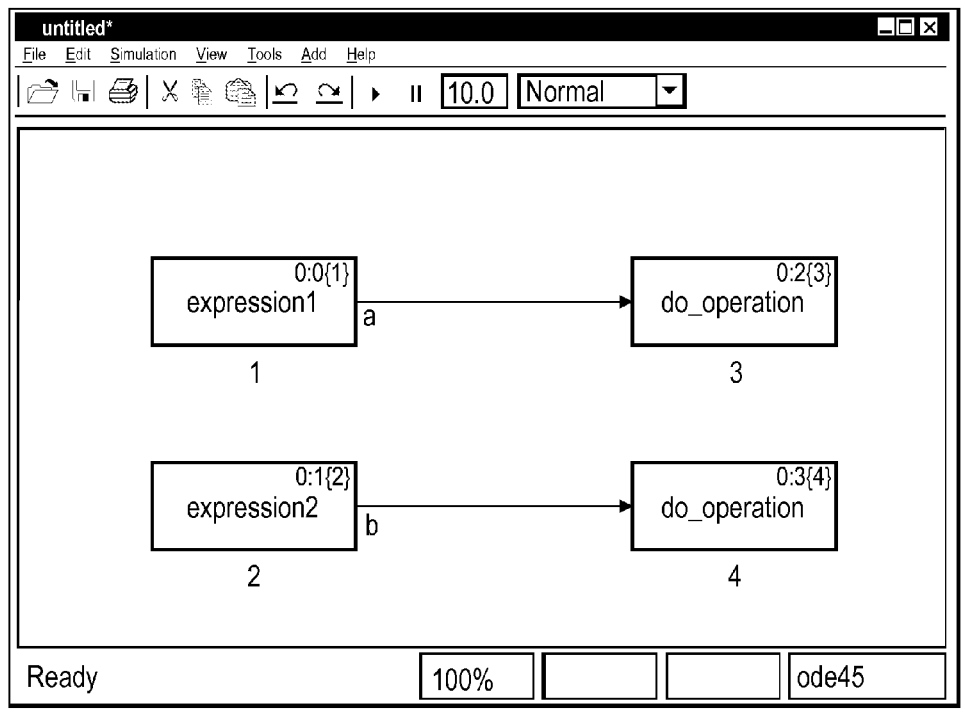
FIG. 5A depicts an example of a graphical model to which a lazy code motion optimization may be applied in generating code for the graphical model.
FIG. 5B depicts one embodiment of code generated from an intermediate representation, prior to the application of an optimization technique to the intermediate representation.
FIG. 5C depicts one embodiment of code generated from an intermediate representation to which a lazy code motion optimization technique has been applied.

The optimization technique applied may be an optimization technique for moving a section of code to a location where the section of code is executed. This optimization technique may be referred to as "lazy code motion." This optimization will move sections of code closer to the location in the code where the section of code is utilized in execution, resulting in improved code readability. Additionally, moving assignments of local variables closer to the location in the code where the variables will be used results in a reduction of the lifespan of local variables and enables a compiler to more efficiently manage a memory stack. FIG. 5A depicts one embodiment of a graphical model that serves as source input for the code generation process where the optimization may be applied. FIG. 5B depicts one embodiment of code generated from a first intermediate representation of the model of FIG. 5A, prior to the application of an optimization technique. Applying an optimization technique such as lazy code motion to the first intermediate representation results in a second, different, intermediate representation. FIG. 5C depicts one embodiment of code generated from the second intermediate representation. In this case, the "do_operation (a)" statement has been moved to immediately follow where "a" is declared to be equal to "expression1."

Figures 6A, 6B, 6C:
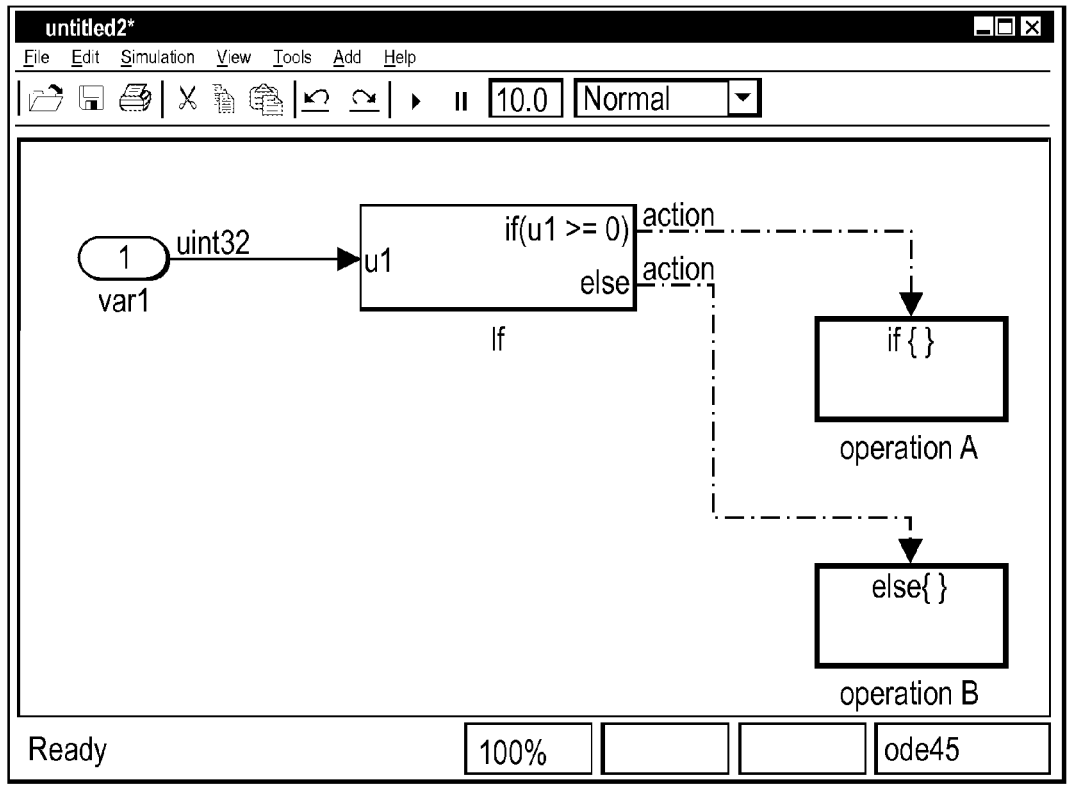
FIG. 6A depicts an example of a graphical model to which an optimization may be applied in generating code for the graphical model.
FIG. 6B depicts one embodiment of C code generated by an intermediate representation prior to the application of an optimization technique to the intermediate representation.
FIG. 6C depicts one embodiment of code generated by an intermediate representation resulting from an application of a range analysis and value propagation optimization technique.

The optimization technique applied may be an optimization technique analyzing a plurality of possible values of a variable and determining that an operation on the variable is superfluous. By analyzing a plurality of possible values of variables based on information associated with each variable, such as data types, assignment operations, and preceding conditions in the execution flow, a determination may be made as to whether a particular operation is superfluous or unreachable. Removing such a variable optimizes the intermediate representation. This optimization technique may be referred to as range analysis and value propagation. FIG. 6A depicts an example of a graphical model that serves as a source input to the code generation process during which this optimization may be applied. FIG. 6B depicts one embodiment of C code generated by an intermediate representation of the graphical model of FIG. 6A prior to the application of an optimization technique to the intermediate representation. An analysis of the code depicted in FIG. 6B indicates that "var1" can only be a non-negative integer number. Thus, the condition check in the code should always be true. This code can be modified by an application of this optimization technique to the intermediate representation. FIG. 6C depicts one embodiment of code generated by an intermediate representation resulting from an application of this optimization technique. This optimization technique is particularly useful for models including integer typed data.

Figures 7A, 7B, 7C:
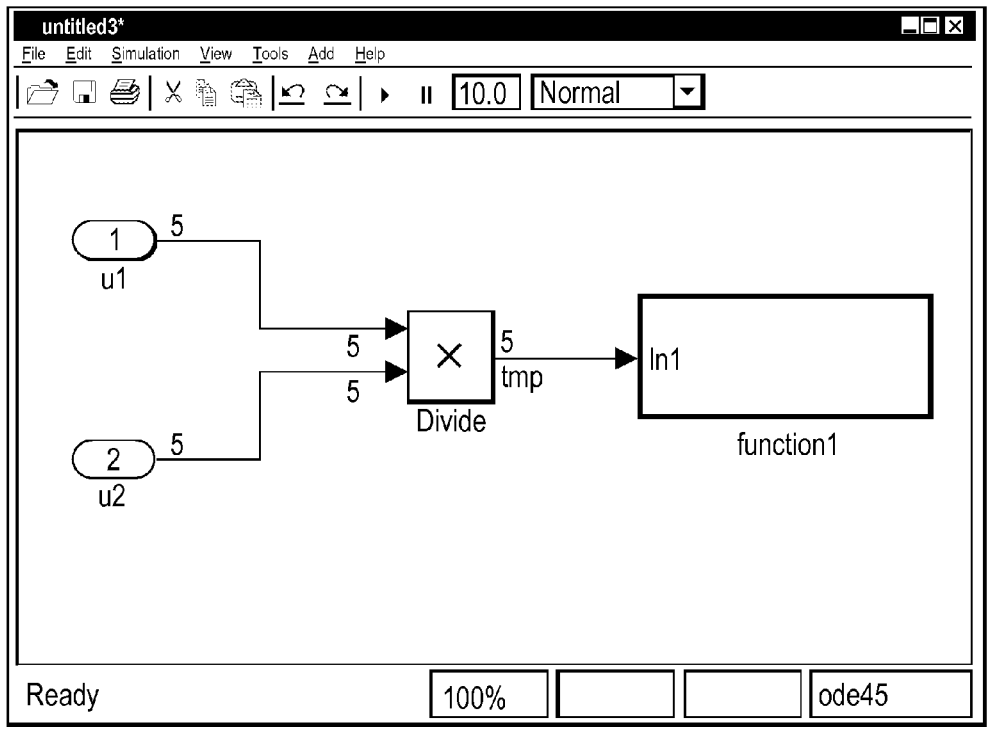
FIG. 7A depicts an example of a graphical model that serves as source input to the code generation process to which an optimization is applied.
FIG. 7B depicts one embodiment of code generated by an intermediate representation prior to the application of an optimization technique to the intermediate representation.
FIG. 7C depicts one embodiment of code generated by an intermediate representation resulting from an application of a strength reduction optimization technique.

The optimization technique applied may be an optimization technique for determining to replace a vector variable with a scalar variable. This optimization technique replaces unnecessary vector variables with scalar variables to reduce memory consumption in the generated code. This optimization technique may be referred to as strength reduction. This optimization is particularly useful in conjunction with loop fusion optimization. FIG. 7A depicts an example of a graphical model that serves as a source input for the code generation process where this optimization is applied. FIG. 7B depicts one embodiment of code generated by an intermediate representation of the graphical model of FIG. 7A prior to the application of an optimization technique. This code can be modified by an application of this optimization technique to generate a second intermediate representation. FIG. 7C depicts one embodiment of code generated from the second intermediate representation.

Figures 8A, 8B, 8C:
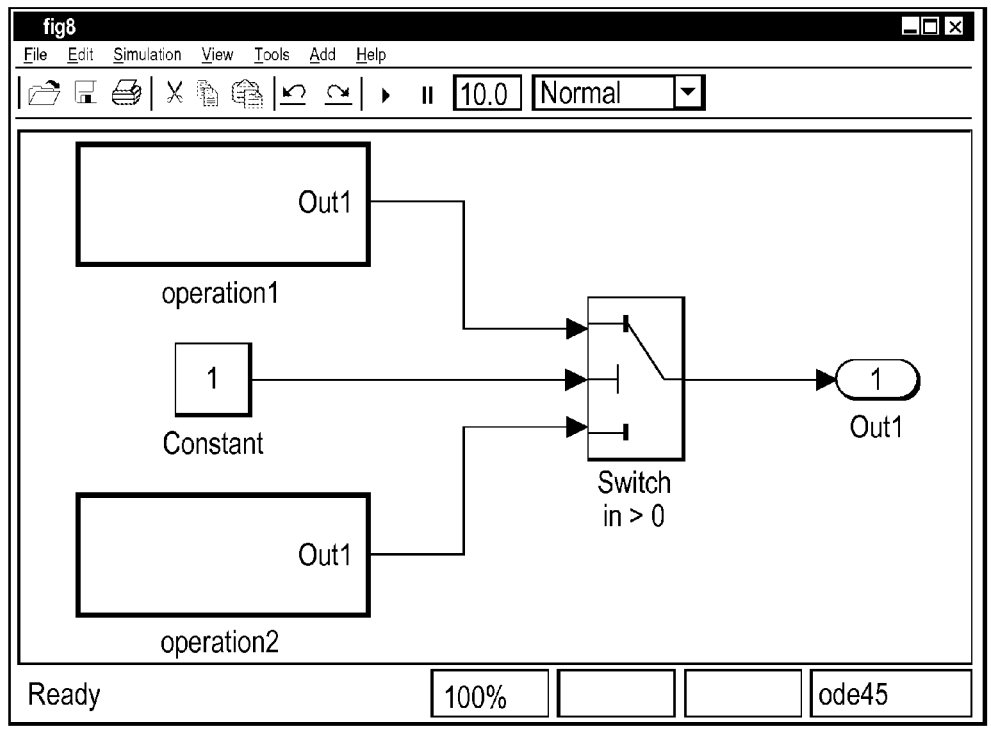
FIG. 8A depicts an example of a graphical model that serves as source input for the code generation process where the dead code elimination optimization is applied.
FIG. 8B depicts one embodiment of code generated by an intermediate representation prior to the application of a dead code elimination technique to the intermediate representation.
FIG. 8C depicts one embodiment of code generated by an intermediate representation resulting from an application of a dead code elimination optimization technique.

The optimization technique applied may be an optimization technique for determining to eliminate non-consequential code. Application of this optimization technique identifies a portion of an intermediate representation that results in generation of unreachable or non-consequential code and removes the identified portions. This optimization technique may be referred to as dead code elimination. FIG. 8A depicts an example of a graphical model that serves as source input to the code generation process where the dead code elimination optimization is applied. FIG. 8B depicts one embodiment of code generated by an intermediate representation of the graphical model of FIG. 8A prior to the application of dead code elimination techniques. Application of a dead code elimination technique to the intermediate representation results in a determination that because the condition expression is always true, the "else" clause of the condition statement will never be executed. The dead code elimination technique will remove the portion of intermediate representation which resulted in generation of the above code. The resulting second intermediate representation may result in the generation of code such as that depicted in FIG. 8C.

The optimization technique applied may be an optimization technique for replacing a constant expression with a value of the constant expression. Application of this optimization technique may include calculation of a value of a constant expression and replacement of the constant expression in the intermediate representation with the result of the calculation. This optimization technique may be referred to as constant folding, and may be used in conjunction with dead code elimination. FIG. 9A shows an example of a graphical model for which this optimization may be applied during the code generation process for the model. FIG. 9B shows an example of code that is generated by an intermediate representation for the model of FIG. 9A. Application of the constant folding technique to the intermediate representation of FIG. 9B results in a simpler expression by calculating the constant components within an expression. FIG. 9C shows code generated from the resulting second intermediate representation where the constant folding optimization has been applied.

Figures 10A, 10B, 10C:
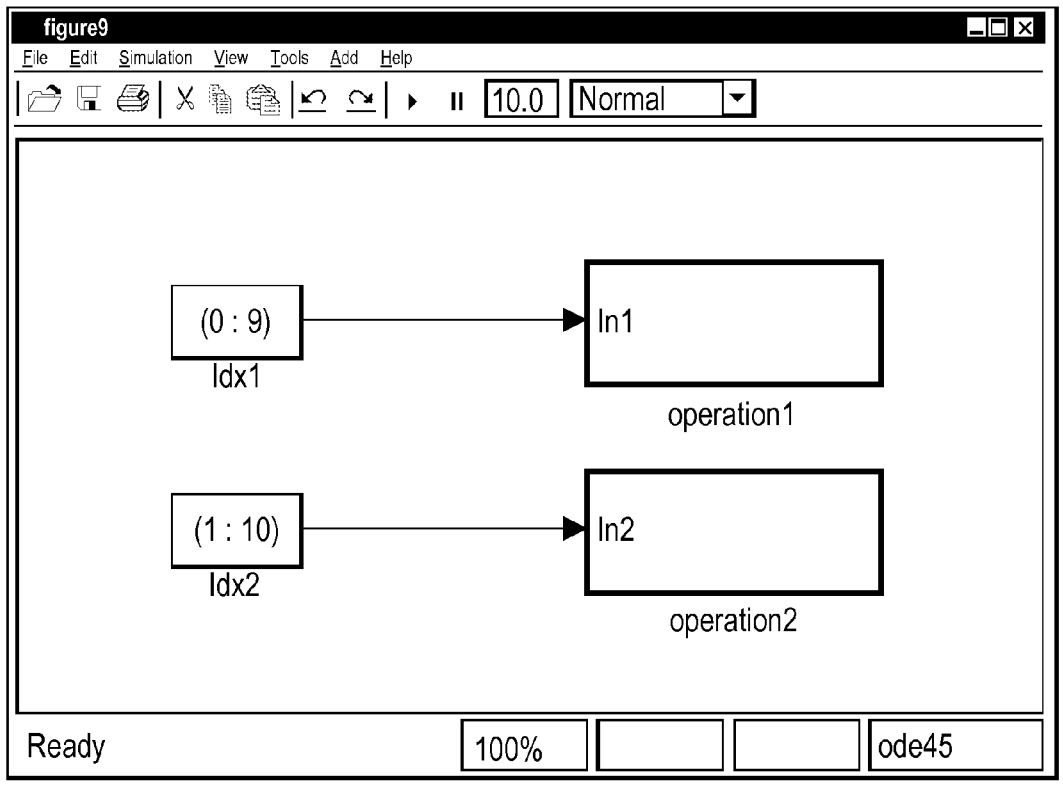
FIG. 10A depicts an example of a graphical model for which during the code generator process the loop fusion optimization is applied.
FIG. 10B depicts one embodiment of code generated by an intermediate representation prior to the application of a loop fusion optimization technique to the intermediate representation.
FIG. 10C depicts one embodiment of code generated by an intermediate representation resulting from an application of a loop fusion optimization technique.

The optimization technique applied may be an optimization technique for determining to combine a plurality of loops having an identical number of iterations into a single loop. FIG. 10A depicts an example of a model where the optimization may be applied during the code generation process for the model. This optimization technique may be referred to as loop fusion. FIG. 10B depicts one embodiment of code generated by an intermediate representation of the model of FIG. 10A prior to the application of a loop fusion optimization technique. Through the application of loop fusion, a second intermediate representation may generate simplified code, such as the C code depicted by FIG. 10C.

The optimization technique applied may be an optimization technique for automatic packaging of a plurality of functions. This technique provides a method for aggregation of C/C++ code generated from a block diagram. In typical aggregation solutions, code generated from blocks in the same container, e.g. a subsystem in Simulink, are aggregated into the same function. Pieces of blocks from different containers within the same block diagram may also be aggregated into the same function for efficiency, which is often called in-lining. However, when a block diagram contains many blocks, the size of generated code could be very large. A large size of code has two disadvantages: decreased readability of the generated code and the risk that a large function may exceed the handling capability of some compilers resulting in correct but incompilable code. Conventional solutions may require users to restructure the original block diagram to separate a large subsystem into multiple small subsystems or to explicitly request separation of some subsystems into different functions. These approaches inconvenience users, especially in solutions where a user cannot deduce from a block diagram how the generated code will appear. The application of an optimization technique, which may be referred to as automatic outlining and function packaging, provides a better solution. In this optimization technique, users decide the approximate maximal size of a function in terms of maximal number of operations, or lines of code. During the code generation process, when it is detected that the number of operations within a function will exceed the maximal size, outlining optimization will separate some content with this function to a separate function. This provides users with readable, compilable, and efficient code, without requiring significant manual intervention.

In the application of this optimization technique, the content of each subsystem in a system model is represented by a separate intermediate representation. Inlining optimization aggregates these intermediate representations into a single intermediate representation, which will eventually generate code for a single function. When an outlining situation is detected, the inlining operation terminates upon reaching the functional size limit. This results in a natural boundary for separated functions. In the event that content of a single subsystem should be placed into separate functions, the intermediate structure for this subsystem may be analyzed to identify the points of separation. There are many ways to perform this analysis. In one embodiment, the number of operations are counted from top of the intermediate representation and a separation point is identified when the number of operations in one section reaches a user-identified limit. In another embodiment, the quality of the separation points is calculated based on the amount of data sharing across each point and a set of separation points is selected to fit a maximum size requirement while enabling minimal data sharing as well. Small amounts of data sharing across separation points reduces the amount of data that needs to pass through function boundaries, which improves efficiency. The amount of data sharing across a separation point can be determined by analyzing the life span of local variables. FIG. 11A depicts one embodiment of code generated from an intermediate representation prior to the application of an optimization technique to the intermediate representation. If the maximum size is set at 3 lines of code, in one embodiment, using the simplest method of code generation results in the code depicted in FIG. 11B.

Analyzing the lifespan of variables results in a determination that the lifespan of variable "a" is line 1-5, that of variable "b" is line 2-3, that of variable "c" is line 3-4, that of variable "d" is 4-5. Thus application of the optimization technique indicates that separating line 2-4 is desirable. One embodiment of an application of this optimization technique to an intermediate representation may result in the generation of the code responsive to the resulting second intermediate representation, as depicted in FIG. 11C.

Another optimization technique applied may be an optimization technique for identifying a trivial assignment and back-folding the assignment. This optimization technique results in an identification of trivial assignments and back-folds these assignments to reduce the number of assignment operations and reduce the number of variables. FIG. 12A depicts one embodiment of C code generated from an intermediate representation prior to the application of a back-folding optimization technique. An application of this optimization technique generates a second intermediate representation, from which C code may be generated as depicted in FIG. 12B. In this embodiment, if rtwB.if is not needed by any other section of code, the optimized code in FIG. 12B is preferable.

The optimization technique applied may be an optimization technique for using a bit field to represent Boolean data. A set of Boolean data may be compacted into a bit field structure. In one embodiment, a first intermediate representation may result in the generation of the C code depicted by FIG. 13A. An application of this optimization technique may compact the above variables into a bit field structure within a second intermediate representation. This second intermediate representation may result in generated code such as the code depicted in FIG. 13B.

For many compilers, each Boolean variable consumes eight-bit of memory. Thus, compacting Boolean variables into a bit field can significantly reduce the memory consumption required by generated code. There is a cost, however, to the application of this particular optimization technique, which is a potentially increased execution speed that may result in embodiments where accessing a bit in a bit field is slower than accessing an addressable variable directly. In an intermediate representation, whether a Boolean variable is implemented by an independent variable or through a bit field structure is inconsequential. Such implementation only occurs when code is generated from the intermediate representation. Therefore, application of this optimization technique increases a level of control available to a user to allow users to make a design decision as to whether memory consumption or run time speed is of greater concern in their particular application.

The optimization technique applied may be an optimization technique for combining a plurality of condition branches having a shared action. When different condition branches have the same action, application of this optimization technique may result in a combined condition statement reducing memory consumption of the generated code. In one embodiment, a first intermediate representation may result in the generation of the C code depicted in FIG. 14A. An application of this optimization technique may combine conditional branches of the same action within a second intermediate representation. This second intermediate representation may result in generated code such as the code depicted in FIG. 14B. Similarly, in another embodiment, a first intermediate representation results in the generation of the C code depicted in FIG. 14C. Combining conditional branches of the same action, may result in code resulting from an optimized second intermediate representation, such as the code depicted in FIG. 14D.

The optimization technique applied may be an optimization technique for using a for-loop to create regular-spaced constant data. For a large regular spaced constant vector, e.g. {0.0, 1.0, 2.0, 3.0, 4.0, 5.0, 6.0, 7.0, 8.0, 9.0}, directly expressed in the generated code can be costly in terms of memory consumption. An alternative is to create this constant vector at the execution time. This embodiment may be used for signal processing applications, where large constant vectors with regular spacing are common. FIG. 15A depicts an embodiment in which an intermediate representation representing a Simulink model with a Constant block of a vector constant results in the generation of the depicted C code. Instead of directly generating constant values into the code, the values may be calculated when needed as in the code depicted in FIG. 15B.

The optimization technique applied may be an optimization technique for replacing trivial statements. An application of this optimization technique may result in the identification of a trivial statement and replacement of the statement with an equivalent but simpler form. FIG. 16A depicts one embodiment in which a first intermediate representation results in the generation of the depicted C code. This optimization technique may generate a second intermediate representation generating code such as the code depicted in FIG. 16B.

The optimization technique applied may be an optimization technique for generating an optimally-sized array of memory from which contiguous regions are used and reused for a local variable associated with a function. FIG. 17A depicts one embodiment of C code generated from a first intermediate representation prior to the application of an optimization technique to the intermediate representation. Application of this optimization technique may result in a second intermediate representation generating code such as the code depicted in FIG. 17B.

Another optimization technique that may be applied is an optimization technique for converting a left-recursive expression to a right-recursive expression. An expression is called "right recursive" if the corresponding Abstract Syntax Tree (AST) is deep on the right side. For example, the expression Result=(k1*(k2*(k3*k4))); may have a corresponding AST such as the one depicted in FIG. 18A. Alternatively, an expression is called "left recursive" if the corresponding AST is deep on the left side. For example, the expression Result= (((k4*k3)*k2)*k1); may have an AST such as the one depicted in FIG. 18B. For some compilers, a right recursive expression results in more memory consumption. Within an intermediate representation, an optimization technique may determine the depth of operands of an operator. By exchanging the position of operands within the intermediate representation, a right recursive expression may be converted to a left recursive expression.

The optimization technique applied may be an optimization technique for automatically reducing a size of a local variable. Through the use of range analysis, an application of this optimization technique may determine the value range of local variables and reduce their word size where appropriate. This will result in reduced memory consumption. In one embodiment, a first intermediate representation may result in the generation of C code such as the code depicted in FIG. 19A. Analyzing the range of the loop index variable i results in a determination that an eight-bit integer is sufficient to cover the range. Thus, one optimization would include the replacement of the loop index variable with an eight-bit integer variable. This optimization may result in a second intermediate representation generating code such as the code depicted in FIG. 19B.

The optimization technique applied may be an optimization technique for identifying a plurality of expressions having a common if-statement. When the plurality of expressions has been identified, a second intermediate representation may be generated which combines the plurality of expressions into a single conditional. FIG. 20A depicts one embodiment in which a first intermediate representation results in the generation of the depicted C code. Identifying and combining the common "if" statements in a second intermediate representation results in generated code such as the code depicted in FIG. 20B. Combining "if" statements as shown above results in an improved readability of the code as well as improved runtime performance.

The optimization technique applied may be an optimization technique for reusing a global variable. In some embodiments, a global variable is defined outside of functional scope and is a persistent piece of memory and potentially usable by multiple functions. Application of this optimization technique may enable identification of a lifespan of a global variable through analysis of the call structure between functions. For a situation using two global variables in which the global variables have non-overlapping life spans, a single global variable may be used and reused. Application of this optimization technique results in a beneficial reduction in the number of global variables in generated code.

Figures 21A, 21B, 22A:
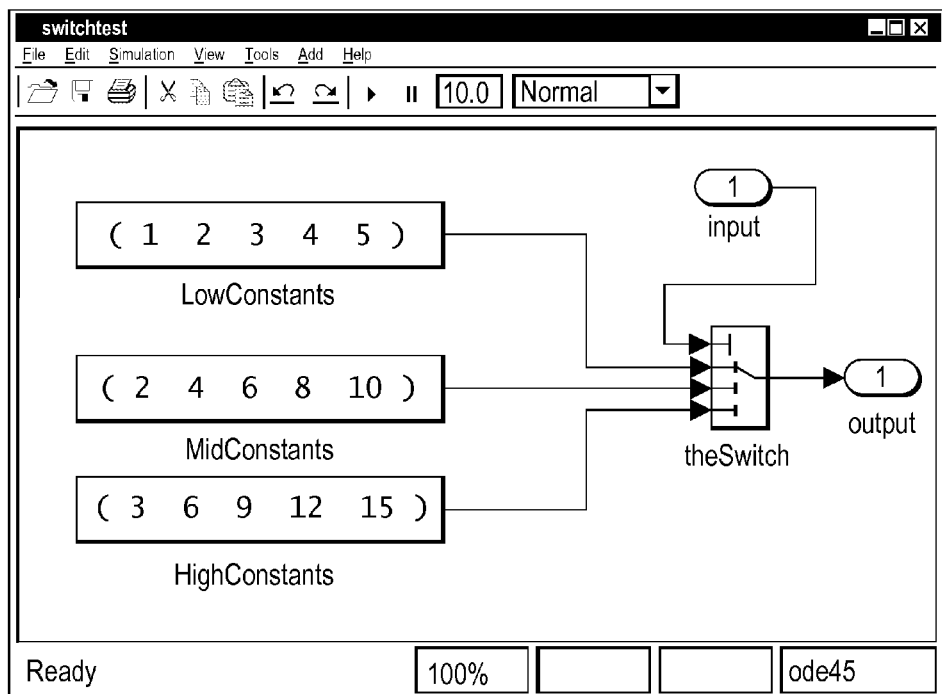
FIG. 21A depicts one embodiment of C code generated from a first intermediate representation prior to the application of an optimization technique to the intermediate representation.
FIG. 21B depicts one embodiment of code generated by an intermediate representation resulting from an application of an optimal local variable scoping optimization technique.
FIG. 22A depicts one embodiment of a switch block connection.

The optimization technique applied may be an optimization technique for declaring a local variable in the lowest scope possible according to a lifespan of the local variable. This optimization technique may be referred to as optimal local variable scoping. This technique may enhance code readability and aid a target language compiler in determining the lifetime of a local variable, which decreases the stack consumption. FIG. 21A depicts one embodiment of C code generated by a first intermediate representation. An application of the optimization technique may enable generation of a second intermediate representation in which the local variable 'b" declaration is moved to a lower scope. FIG. 21B depicts one embodiment of the resulting, optimized code.

The optimization technique applied may be an optimization technique for replacing a data set copy with a pointer copy. In a block diagram environment, a Switch block may be used to pass data sets according to a selection criterion. A typical implementation copies inputs to the block output according to selection criterion. FIG. 22A depicts one embodiment of a switch block connection. FIG. 22B depicts one embodiment of code generated from an intermediate representation representing the switch connection shown in FIG. 22A. An optimization technique applied to the intermediate representation generating the code shown in FIG. 22B may determine when data buffers are read and written. When a determination is made that all the read operations of the output buffer of the Switch block occur prior to the occurrence of any write operations to input data buffers that are later than the switch selection operation, the switch selection operation may be implemented using a pointer instead of creating a new data buffer. FIG. 22C shows one embodiment of code generated from a second intermediate representation which results from an application of the above optimization technique. Application of this optimization technique reduces RAM consumption, improves readability and improves run time speed of the generated code.

Utilizing the second intermediate representation of the present invention, a system implementation can be created. The system implementation may be a textual or binary code, created based on the second intermediate representation. A backend utility may be chosen based on the target of the code generation process. In one embodiment of the present invention, the system implementation can be in a hardware description language such as VHDL, a programming language such as C or C++, an electronic database format, or some combination thereof. This system implementation can be readily used to fabricate the system using software and hardware components. For example, the system implementation can include a Verilog data file, which can be used with existing semiconductor fabrication techniques, as understood by those skilled in the art, to construct an electronic circuit. In an alternate embodiment, the system implementation can include C or C++ source code, which can be used in conjunction with a compiler and operating system, as understood by those skilled in the art, to create an executable program. In still another embodiment, the system implementation may be another form of intermediate representation, e.g. the MathWorks' TLC (Target Language Compiler) code format.

Figure 23:
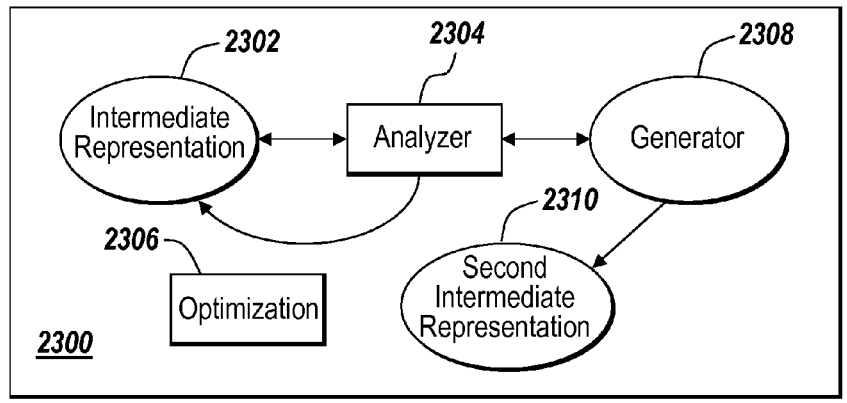
FIG. 23 is a block diagram depicting one embodiment of a system for optimizing an intermediate representation in a graphical modeling environment.

FIG. 23 is a block diagram depicting one embodiment of a system for optimizing an intermediate representation in a graphical modeling environment. The system 2300 includes an intermediate representation 2302, an analyzer 2304, an optimization 2306, a generator 2308, and a second intermediate representation 2310. The graphical modeling environment may be a block diagram model environment.

The first intermediate representation 2302 may be derived from an implementation in a source language of a system model, as described above with regard to FIG. 2. The first intermediate representation 2302 may be provided to the analyzer 2304. The analyzer 2304 analyzes the first intermediate representation and applies at least one optimization technique 2306 to the first intermediate representation. In one embodiment, the analyzer 2304 selects an optimization technique from a plurality of optimization techniques. In some embodiments, the analyzer 2304 selects an optimization technique 2306 responsive to the analysis of the first intermediate representation. In other embodiments, the analyzer 2304 selects an optimization technique 2306 based on a target language. The selection may result in an intermediate representation designed to satisfy the requirements of a particular target language.

The optimization technique 2306 may be an optimization technique for eliminating a common sub-expression in the intermediate representation. The optimization technique 2306 may be an optimization technique for moving a section of code to a location where the section of code is executed. The optimization technique 2306 may be an optimization technique analyzing a plurality of possible values of a variable and determining that an operation on the variable is superfluous. The optimization technique 2306 may be an optimization technique for determining to replace a vector variable with a scalar variable. The optimization technique 2306 may be an optimization technique for determining to eliminate non-consequential code.

The optimization technique 2306 may be an optimization technique for replacing a constant expression with a value of the constant expression. The optimization technique 2306 may be an optimization technique for determining to combine a plurality of loops having an identical number of iterations into a single loop. The optimization technique 2306 may be an optimization technique for automatic packaging of a plurality of functions. The optimization technique 2306 may be an optimization technique for identifying a trivial assignment and back-folding the assignment.

The optimization technique 2306 may be an optimization technique for using a bit field to represent Boolean data. The optimization technique 2306 may be an optimization technique for combining a plurality of condition branches having a shared action. The optimization technique 2306 may be an optimization technique for using a for-loop to create regular-spaced constant data. The optimization technique 2306 may be an optimization technique for replacing trivial statements. The optimization technique 2306 may be an optimization technique for generating customizable code style.

The optimization technique 2306 may be an optimization technique for generating an optimally-sized array of memory from which contiguous regions are used and reused for a local variable associated with a function. The optimization technique 2306 may be an optimization technique for converting a left-recursive expression to a right-recursive expression. The optimization technique 2306 may be an optimization technique for automatically reducing a size of a local variable. The optimization technique 2306 may be an optimization technique for identifying a plurality of expressions having a common if-statement. The optimization technique 2306 may be an optimization technique for reusing a global variable. The optimization technique 2306 may be an optimization technique for replacing a data set copy with a pointer copy. The optimization technique 2306 may be an optimization technique for declaring a local variable in the lowest scope possible according to a lifespan of the local variable.

A generator 2308, in communication with the analyzer 2304 generates a second intermediate representation responsive to the applying of the at least one optimization technique to the first intermediate representation. The generator 2308 may generate the second intermediate representation such that the second intermediate representation maintains the algorithmic meaning of the first intermediate representation. The functionality of the analyzer 2304 and of the generator 2308 may be provided by a back end system, such as the back end 2408 described below in FIG. 23. The generator 2308 may also generate code in a target language responsive to the second intermediate representation.

Figure 24:
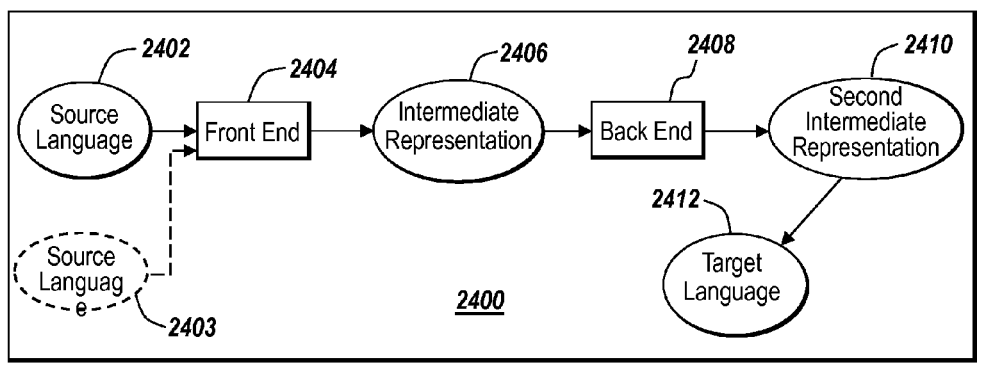
FIG. 24 is a block diagram depicting one embodiment of a system incorporating an embodiment of the present invention.

FIG. 24 is a block diagram depicting an environment suitable for use in practicing an embodiment of the present invention. The graphical model 2400 illustrates a front end 2404 receiving a system representation in a single source language 2402 and in turn outputting an intermediate representation 2406. The intermediate representation 2406 may also be derived in part from an additional system representation in another source language 2403. In fact, a portion of the system representation may be encoded in a source language 2402 and another portion encoded in source language 2403. The intermediate representation 2406 is passed to a back end 2408, which processes the intermediate representation to output a second intermediate representation 2410. The second intermediate representation 2410 may be processed to generate a system representation in a target language 2412. The target language 2412 can further be used by an external program to generate executable code or hardware or be processed further. Those skilled in the art will recognize that a plurality of source languages 2402, front ends 2404, back ends 2408 and target languages 2412 can be employed in simultaneous fashion in the present invention based upon the needs of the user.

The source language 2402 suitable for use with the present invention may be any language that adequately defines the system behavior of a system model. Examples of applicable source languages include, but are not limited to, a block diagram programming language, a statechart programming language, a matrix language programming language, a hardware description language, a programming language or a graphical circuit language. The source language 2402 may be, for example, a language found in a block diagram model environment such as Simulink® from The MathWorks, of Natick, Mass.

The front end 2404 receives the source language 2402 file and translates the file into an intermediate representation 2406. The intermediate representation 2406 of the present invention is in a source and target language independent format, such that data contained within the intermediate representation is not specific to the source language 2402 from which it was generated. The data contained within the intermediate representation 2406 is used for subsequent code generation and the eventual generation of a representation of the data using a target language 2412.

The front end 2404 of the present invention is capable of converting a source language 2402 of one of a variety of types into one or more intermediate representations 2406, such that various system models can be used to describe individual behaviors of the modeled system using the most applicable language for the desired results. The front end 2404 of the present invention may be capable of translating these various source languages 2402 into a single intermediate representation 2404 for use in conversion into the target language 2412.

The translation of the source language 2402 to the intermediate representation 2406 can be completed using numerous means recognized by those skilled in the art. One suitable example is the Real-Time Workshop® (RTW) coder, offered by The MathWorks of Natick, Mass. This coder can be utilized in converting a source language 2402 to an intermediate representation 2406. Using the RTW coder, the file in the source language 2402 is converted into an intermediate representation 2406, wherein the file contained within the intermediate representation 2406 is in a source and target language independent format. The use of the RTW coder is a representative example, and those skilled in the art will readily recognize that the intermediate representation can be generated using numerous coding mechanisms for processing serial and parallel source languages.

The back end 2408 generates the second intermediate representation 2410 in response to the application of an optimization technique to the intermediate representation 2406. The back end 2408 may employ an analyzer 2304 and a generator 2308 to perform the generation. An element within the back end 2408, such as an analyzer 2304, may apply an optimization technique to the intermediate representation 2406, or a separate element, such as an analyzer 2304 executing outside of the back end 2408, may apply the optimization technique.

The back end 2408 may generate code in a target language 2412 based on the second intermediate representation 2410. The generated code in the target language 2412 can further be used to fabricate an electronic circuit using automated microprocessor manufacturing techniques understood by those skilled in the art. In one embodiment, the back end 2408 outputs a target language 2412 in C or C++ format. The target language 2412 can then be used with an external compiler to generate executable code as required.

In some embodiments of the present invention, optimization techniques are applied to the back end 2408. Some optimization techniques applied to the back end 2408 enable the generation of customizable code style. When generating code from an intermediate representation, the back end 2408 determines the content of the generated code. By controlling and optimizing the determination made by the back end 2408, different styles of code may be generated from a single intermediate representation. This technique provides flexibility for users to customization the style of generated code.

One optimization of the back end 2408 enables the declaration of a variable individually or in a concise form. One example of a typical variable declaration is depicted in the code shown in FIG. 25A. An equivalent code of different style generated from one embodiment of an optimized back end 2408 is depicted in FIG. 25B.

Another optimization of the back end 2408 enables concise code format through expression folding optimization. However, if an expression becomes too large or too complicated, the resulting code may suffer from a lack of readability. Users of an optimized back end 2408 may choose a maximal complexity of an expression by selecting an expression-folding threshold. This allows simple expressions to be folded together without resulting in overly complex expression.

One optimization of the back end enables the customization of the style used to display conditional if statements. For example, an optimized back end 2408 might produce either code depicted in FIG. 26A or the code depicted in FIG. 26B. Enabling the back end 2408 to produce code in either style provides greater control to a user of the invention.

Another optimization of the back end 2408 provides for generation of reusable functions. A subsystem that is used in multiple places in a system model may be generated as a reusable function. It may also be inlined in call sites. Generating a reusable function can reduce ROM consumption, while generating inlined code improves execution efficiency. Allowing users to determine the suitable threshold to determine whether to generate inlined code or reusable functions, where the thresholds may be based on conditions such as the number of lines of code.

Still another optimization of the back end 2408 enables the use of additional parentheses. In some cases, style guideline and compliance rules required by a user must generate expressions that do not rely on the rules of precedence used in the C programming language. In such a case, extra parentheses are needed to deterministically specify the execution order within an expression. For example, the expression "if (numerator<0!=denominator<0) {" is correct and well defined by C precedence. However, without C precedence, an extra parentheses should be included in the expression, forming an expression such as the following: "if((numerator<0)!=(denominator<0)) {". Both expressions may be generated from a single intermediate representation, if the back end 2408 generating the code is optimized to enable the use of a different style.

One optimization of the back end 2408 enables the use of hexadecimal constants in generated code. Typically, decimal constants are generated within the code. For some users, hexadecimals constants may be more desirable. A single intermediate representation may generate either type of constant, if the back end 2408 generated the code responsive to the intermediate representation is optimized to enable a user to determine which style the back end 2408 should generate.

One optimization of the back end 2408 enables the use of a conditional expression in addition to the use of an if statement. C and C++ provide conditional expressions for use with simple conditional operations. For example, the expression "a=(cond)?1:0;" is such a conditional statement. Such a conditional statement may be expressed as an if statement, such as the following:

```
if (cond) {
    a = 1;
} else {
    a = 0;
}
```

Some users may require the concise format of a conditional expression while others prefer if statements to enable compliance with a particular code style. An optimized back end 2408 enables users to determine the style generated.

One optimization of the back end 2408 enables the use of different commenting styles. C programmers traditionally use /* */ to mark comments. C++ programmers, however, are more familiar with // commenting style. An optimized back end 2408 enables users to determine the style of generated for comments.

One optimization of the back end 2408 enables the use of different methods for accessing array elements. An optimized back end 2408 enables users to determine the style of generated comments. Array indexing, expressed in code such as the embodiment depicted in FIG. 27A is one style. Another style, depicted in FIG. 27B, enables access to the array elements using a pointer offset. An optimized back end 2408 enables users to determine the style of generated for comments.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

I claim:

1. A method comprising:
   interacting, using a processor, with a first intermediate representation, the first intermediate representation produced from at least one implementation in at least one source language of an executable system model in a graphical modeling environment;
   applying, using the processor, an optimization technique to the first intermediate representation; and
   generating, using the processor, a second intermediate representation based on the applying of the optimization technique to the first intermediate representation, the second intermediate representation being an augmentation, reduction, or transformation of the first intermediate representation; and
   generating code for the executable system model using the second intermediate representation, the generated code exhibiting at least one of reduced memory consumption or improved stack management as compared to code generated using the first intermediate representation.

2. The method of claim 1, wherein the applying causes the generated code to handle tasks in real time when the generated code is executed.

3. The method of claim 1, wherein the optimization technique is applied to a part of the intermediate representation representing only to a portion of the executable system model, the portion being a subset of the executable system model that is less than the entire executable system model.

4. The method of claim 1, wherein the applying comprises:
   eliminating an expression in the first intermediate representation.

5. The method of claim 1, wherein the applying comprises:
   applying the optimization technique to a block type in the executable system model.

6. The method of claim 1, wherein the optimization technique is applied to an intermediate representation of a selected block in the executable system model.

7. The method of claim 1, further comprising:
   selecting, based on a target language, the optimization technique from a plurality of techniques.

8. The method of claim 1, wherein the applying aggregates at least a portion of the generated code.

9. A system for generating an intermediate representation, the system comprising:
- a storage for storing a first intermediate representation, the first intermediate representation produced from at least one implementation in at least one source language of an executable system model; and
- a processor to:
  - analyze the first intermediate representation,
  - apply an optimization technique to the first intermediate representation,
  - generate a second intermediate representation based on the applying, and
  - generate code for the executable system model using the second intermediate representation,
    - the generated code, using the second intermediate representation, exhibiting at least one of reduced memory consumption or improved stack management as compared to code generated using the first intermediate representation.

10. The system of claim 9, wherein the applying causes the generated code to handle tasks in real time when the generated code is executed.

11. The system of claim 9, wherein the second intermediate representation is an augmentation, reduction, or transformation of the first intermediate representation.

12. The system of claim 9, wherein applying the optimization technique changes a content, a structure, or a format of the first intermediate representation to produce the second intermediate representation.

13. The system of claim 9, wherein the applying eliminates an expression in the first intermediate representation.

14. The system of claim 9, wherein the applying aggregates at least a portion of the generated code.

15. A non-transitory computer readable medium storing instructions, the instructions comprising:
- one or more instructions that, when executed by a processor, cause the processor to:
  - interact with a first intermediate representation, the first intermediate representation produced from at least one implementation in at least one source language of an executable system model;
  - apply an optimization technique to the first intermediate representation;
  - generate a second intermediate representation based on the applying; and
  - generate code for the executable system model using the second intermediate representation, the generated code exhibiting at least one of reduced memory consumption or improved stack management as compared to code generated using the first intermediate representation.

16. The medium of claim 15, wherein the applying causes the generated code to handle tasks in real time when the generated code is executed.

17. The medium of claim 15, wherein the second intermediate representation is an augmentation, reduction, or transformation of the first intermediate representation.

18. The medium of claim 15, wherein the applying changes a content, a structure, or a format of the first intermediate representation to produce the second intermediate representation.

19. The medium of claim 15, wherein the applying eliminates an expression in the first intermediate representation.

20. The medium of claim 15, wherein the applying aggregates at least a portion of the generated code.

* * * * *

UNITED STATES PATENT AND TRADEMARK OFFICE
CERTIFICATE OF CORRECTION

PATENT NO. : 8,918,769 B2  
APPLICATION NO. : 13/681748  
DATED : December 23, 2014  
INVENTOR(S) : Xiaocang Lin Page 1 of 1

It is certified that error appears in the above-identified patent and that said Letters Patent is hereby corrected as shown below:

Title page, column 2, line 3, under "Other Publications" replace "Iproj" with --lproj--.

Title page 2, column 2, line 1, replace "Appliation" with --Application--.

Signed and Sealed this  
Fourteenth Day of July, 2015

Michelle K. Lee  
*Director of the United States Patent and Trademark Office*